United States Patent
Di Marco et al.

(10) Patent No.: US 12,052,644 B2
(45) Date of Patent: Jul. 30, 2024

(54) METHOD OF WAKING UP A MESH NODE IN A WIRELESS MESH NETWORK AS WELL AS A RELATED MESH NODE AND A COMPUTER PROGRAM PRODUCT

(71) Applicant: Telefonaktiebolaget LM Ericsson (publ), Stockholm (SE)

(72) Inventors: Piergiuseppe Di Marco, Teramo (IT); Per Skillermark, Årsta (SE); Leif Wilhelmsson, Lund (SE); Magnus L. Olsson, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 319 days.

(21) Appl. No.: 17/617,783

(22) PCT Filed: Jun. 11, 2019

(86) PCT No.: PCT/EP2019/065196
§ 371 (c)(1),
(2) Date: Dec. 9, 2021

(87) PCT Pub. No.: WO2020/249191
PCT Pub. Date: Dec. 17, 2020

(65) Prior Publication Data
US 2022/0232449 A1    Jul. 21, 2022

(51) Int. Cl.
*H04W 40/00* (2009.01)
*H04W 40/22* (2009.01)
*H04W 40/24* (2009.01)
*H04W 52/02* (2009.01)

(52) U.S. Cl.
CPC ......... *H04W 40/005* (2013.01); *H04W 40/22* (2013.01); *H04W 40/248* (2013.01); *H04W 52/0229* (2013.01)

(58) Field of Classification Search
CPC . H04W 40/005; H04W 40/22; H04W 40/248; H04W 40/24; H04W 52/0229; H04W 52/0219; H04W 88/06
See application file for complete search history.

(56) References Cited

U.S. PATENT DOCUMENTS

| | | | |
|---|---|---|---|
| 8,514,758 B2 | 8/2013 | De et al. | |
| 2004/0218556 A1* | 11/2004 | Son | H04W 52/0225 370/318 |
| 2011/0305136 A1 | 12/2011 | Pan et al. | |
| 2017/0064623 A1* | 3/2017 | Sekiya | H04B 3/36 |
| 2018/0192373 A1* | 7/2018 | Fang | H04L 27/06 |
| 2020/0163017 A1* | 5/2020 | Priyanto | H04W 88/04 |

* cited by examiner

*Primary Examiner* — Farid Seyedvosoghi
(74) *Attorney, Agent, or Firm* — Murphy, Bilak & Homiller, PLLC

(57) ABSTRACT

A method of waking up a mesh node in a wireless mesh network, wherein said mesh node comprises a main receiver and a wakeup receiver, and wherein said method comprises the steps of receiving, by said wakeup receiver of said mesh node, a wake up signal message, wherein said wake up signal message comprises context information which is related to a path between a source mesh node and a destination mesh node corresponding to said wake up signal message, determining, by said wakeup receiver of said mesh node, that said context information is applicable for said mesh node, activating, by said wakeup receiver of said mesh node, said main receiver of said mesh node for subsequently receiving a data message.

13 Claims, 3 Drawing Sheets

METHOD OF WAKING UP A MESH NODE IN A WIRELESS MESH NETWORK AS WELL AS A RELATED MESH NODE AND A COMPUTER PROGRAM PRODUCT

TECHNICAL FIELD

The present invention generally relates to wireless mesh networks and, more specifically, relates to improvements to forwarding of data messages in those wireless mesh network, such as Bluetooth mesh networks.

BACKGROUND

Bluetooth™ refers generally to a standardized group of technologies usable to exchange data between devices over short distances using radio transmission and reception in the 2.4-GHz ISM band. The promulgation and management of Bluetooth standards is done by various committees of the Bluetooth SIG, of which over 30,000 companies are members.

Bluetooth Low Energy (LE) is a particular version of Bluetooth technology that was first standardized by the Bluetooth SIG in 2010. Bluetooth LE is generally targeted at low-power applications that can tolerate lower-rate communications than, e.g., more traditional Bluetooth applications. Furthermore, Bluetooth LE is suitable for inexpensive devices that are constrained in terms of memory and computational resources.

Even so, Bluetooth LE leverages a robust frequency-hopping spread spectrum approach that transmits data over 40 channels. Furthermore, a Bluetooth LE-compliant radio includes multiple physical layer (PHY) options that support data rates from 125 kb/s to 2 Mb/s, multiple power levels, from 1 mW to 100 mW, as well as multiple security options.

Bluetooth LE also supports multiple network topologies, including a conventional point-to-point topology used for establishing one-to-one (1:1) communications between two devices. In addition, Bluetooth LE supports a broadcast (one-to-many, or 1:m) device communications. The broadcast topology can be used for localized information sharing and for location services such as retail point-of-interest information, indoor navigation and wayfinding, and item/asset tracking.

Finally, Bluetooth LE supports a mesh topology that can be used for establishing many-to-many (m:m) device communications. The mesh topology based on Bluetooth LE can enable the creation of large-scale device networks such as for control, monitoring, and automation systems where tens, hundreds, or thousands of devices need to reliably and securely communicate with each other. In the Bluetooth LE mesh topology, each device in a mesh network potentially can communicate with every other device in the mesh network. Communication is achieved using messages, and devices can relay messages to other devices so that the end-to-end communication range is extended far beyond the radio range of each individual device.

Devices that are part of a Bluetooth LE mesh network are often referred to as "nodes" whereas other devices not part of the mesh (e.g., even though within range of the mesh) are often referred to as "unprovisioned devices." The process of transforming an unprovisioned device into a node is often referred to as "provisioning," while the device responsible for adding a node to a network and configuring its behavior is often referred to as a "provisioner." Provisioning is a secure procedure which results in an unprovisioned device possessing a series of encryption keys and being known to the provisioner, such as a tablet or smartphone.

As mentioned above, communication in a Bluetooth mesh network is "message-oriented" and various message types are defined. For example, when a node needs to query the status of other nodes or needs to control other nodes in some way, it can send a message of a suitable type. If a node needs to report its status to other nodes, it can send a message of suitable type. Messages must be sent from an address and to an address. Bluetooth mesh topology supports three different types of addresses.

A unicast address uniquely identifies a single element (e.g., devices can include one or more elements), and unicast addresses are assigned to devices during the provisioning process. A group address is a multicast address which represents one or more elements. A virtual address may be assigned to one or more elements, spanning one or more nodes.

Wake-up receivers (WUR), sometimes also referred to as wake-up radios, provide a means to significantly reduce the power consumption in wireless receivers. The basic idea of WUR is a receiver built on a very low complexity architecture, that only needs to be able to detect the presence of a wake-up signal but will not be used for any data reception Wake-up receivers are currently being standardized for IEEE 802.11 by the IEEE 802.11ba task group and the specification is expected to be finalized in 2019. The concept is relevant for the Bluetooth technology as well. 3GPP has also introduced support for NB-IoT and LTE-M IDLE mode wake-up signaling in release 15 of the 3GPP specification as means for reducing power consumption.

Relays in Bluetooth mesh assume that the radio receiver is always on, consuming typically 15 mA of current constantly. Without mains power, a relay would consume a set of 2 AA Alkaline batteries (~4000 mAh) in about 10 days. A wakeup radio receiver can operate as low as 50 uA, therefore providing a theoretical lifetime of 9 years using 2 AA batteries, by only counting the energy needed for the actual management of the relay.

The wakeup radio concept has been extensively studied and standardized for peer-to-peer or star networks (e.g., 802.11ba). However, it is not immediately clear how to apply it to a multi-hop (or mesh) network scenario.

The first challenge is that a wake-up radio requires a multi-step procedure for data transmission:
 The transmitter sends a wakeup signal to the intended receiver.
 The receiver turns on the main radio
 The receiver acknowledges the reception of the wakeup signal (optional).
 The transmitter sends the data message.

The need to send (and acknowledge) the wakeup signal introduces delays in the actual data communication. In a multi-hop scenario according to the prior art, the procedure is repeated sequentially at each hop, thus the delay at each hop is summed up.

For a communication path with N hops, the procedure requires 3N hops steps to be completed.

Secondly, as for the case of a Bluetooth Mesh network, a node may not know the address of the next-hop node towards the destination, and there can be multiple nodes in the neighborhood that are serving the same path. In this case, the prior art cannot be applied directly as each node may need to wakeup all receivers in the neighborhood to make sure that the data message will be propagated all the way to the destination.

SUMMARY

It would be advantageous to obtain a method for waking up a mesh node which is more suitable for a low power solution.

In a first aspect, there is provided a method of waking up a mesh node in a wireless mesh network, wherein said mesh node comprises a main receiver and a wakeup receiver.

The method comprises the steps of:
- receiving, by said wakeup receiver of said mesh node, a wake up signal message, wherein said wake up signal message comprises context information which is related to a path between a source mesh node and a destination mesh node corresponding to said wake up signal message;
- determining, by said wakeup receiver of said mesh node, that said context information is applicable for said mesh node;
- activating, by said wakeup receiver of said mesh node, said main receiver of said mesh node for subsequently receiving a data message.

It was one of the insights of the inventors that there is no need for each of the mesh nodes to wake up once a wake up signal message is received. Only those nodes that participate actively in the path between the source mesh node and the destination mesh node are to be woken up. As such, the present disclosure provides to include context information in the wake up message, wherein the context information is related to the path between the source mesh node and the destination mesh node. A particular mesh node receiving the wake up signal message shall than be woken up if the context information is relevant for that particular mesh node. That is, that particular mesh node forms a part of the path between the source mesh node and the destination mesh node.

One of the advantages of the above described method is that mesh nodes are able to save power as they are not woken up when it's not necessary.

It is noted that, in accordance with the present disclosure, the wording main receiver and wakeup receiver are chosen for their functional purpose. There is no need for actually physically separating the main receiver and the wakeup receiver in a particular mesh node. In other words, a particular mesh node may have at least two operating states: A normal active state and a sleep state. In the sleep state, the mesh node is operating in such a way that it hardly consumes any power. The mesh node may, for example, only be arranged for receiving wakeup messages, and may have shut down all other functionality for increasing power savings. In the normal active state, the mesh node may be fully operational. That is, the mesh node may be arranged to initiate transmissions, may be arranged to forward incoming data message, may be arranged to act as a relay node, may be arranged to perform measurements, or anything alike. In this normal active state, the mesh node may consume much more power compared to the sleep state.

In accordance with the present disclosure, the context information may, for example, comprise a list of identities of mesh nodes that are involved in a path between a source mesh node and a destination mesh node. Only if the identity of the mesh node that receives the wake up signal message is present on the list, that particular mesh node may wake up, as it is clear that that particular node is to be involved in the path between the source mesh node and the destination mesh node.

In an example, the context information comprises an identification of a next mesh node in said path between said source mesh node and said destination mesh node, and wherein said step of determining comprises:
- determining, by said wakeup receiver of said mesh node, that said mesh node corresponds to said identification of said next mesh node in said path.

The above described example is directed to the concept that the wake up signal message may only contain the identity of the next hop in the path between the source mesh node and the destination mesh node. A particular mesh node may then wake up if the identity comprised by the wake up signal message matches the identity of the particular mesh node.

The wake up signal message may then be amended, by that particular mesh node, in such a way that the identity of the mesh node in the context information is replaced by the identity of the next hop in the wireless mesh network.

In a further example, the mesh node comprises a forwarding table having listed source address and destination address pairs for which said mesh node is to act as a relay, and said context information comprises a Path Identifier, PID, reflecting a source address of said source mesh node and a destination address of said destination mesh node, and wherein said step of determining comprises:
- determining, by said wakeup receiver of said mesh node, that said PID is associated to a source address and destination address pair in said forwarding table.

Certain existing wireless mesh network operate using a PID. The inventors have found that the PID may also be used effectively for determining whether a particular mesh node is to wake up or not. As such, the PID may be introduced in the wake up signal message.

In a further example, the context information comprises a Message identifier, MID, reflecting a source address of said source mesh node and a Sequence number, SEQ, that is increased for each source address for every new Protocol Data Unit, PDU, wherein said step of determining comprises:
- determining, by said wakeup receiver of said mesh node, that said MID is not associated to a network PDU in a cache of said mesh node.

Certain other existing wireless mesh network operate using a MID which reflects a source address of the source mesh node and a sequence number. The inventors have found that it may be beneficial to use the MID in a wake up signal message, as the MID may be used by a mesh node for determining whether it has an active role in a path between the source mesh node and a destination mesh node.

In a further example, the context information comprises a Time-To-Live, TTL, field reflecting a number of hops of said wakeup signal message in said wireless mesh network, wherein said method further comprises the steps of:
- receiving, by said main receiver of said mesh node, said data message;
- receiving, by any of said wakeup receiver and said main receiver, a further wakeup signal message comprising context information which is related to said same path between said source mesh node and said destination mesh node corresponding;
- determining, by any of said wakeup receiver and said main receiver, that a TTL field in said context information of said further wakeup signal message is lower that a TTL field in said context information of said wakeup signal message;
- forwarding, by said mesh node, said received data message in said wireless mesh network based on said determination.

The above described example is useful for reducing the latency in the wireless mesh networks. In prior art situations, the wake up signal message is propagated through the entire wireless mesh network to the destination mesh node. Each of the nodes involved in the path between the source mesh node and the destination mesh node are arranged for acknowledging receipt of the wake up signal message. Only once all nodes have provided such an acknowledgment, the corresponding data message is sent.

The inventors have found that the above described process may be made more efficiently by not waiting until each of the nodes in the path has acknowledged receipt of the wake up signal message. More specifically, the present example uses the concept that a particular mesh node uses the wake up signal message that is forwarded by the subsequent mesh node as a confirmation/acknowledgment that the initial wake up signal message is received correctly. As such, there is no need for a standalone, dedicated, acknowledgment message to be sent by any of the mesh nodes in the path.

Further, a data message may be sent by a particular mesh node once a confirmation of the wake up signal message is received by that particular mesh node. There is no need for each of the mesh nodes in the wireless mesh network to provide for confirmations/acknowledgments, as the data may already be sent by a particular mesh node once the subsequent mesh node has provided an acknowledgment. The process of distributing the wake up signal message and the data message are then performed almost in parallel. This reduces time, and thus reduces latency.

In a further example, the method further comprises the step of:
forwarding, by said mesh node, said wakeup signal message in said wireless mesh network.

In another example, the method further comprises the step of:
receiving, by any of said wakeup receiver and said main receiver, a further wakeup signal message, wherein said further wakeup signal message acts as an acknowledgment for said forwarded wakeup signal message.

In a second aspect of the present disclosure, there is provided a mesh node arranged for operation in a wireless mesh network, wherein said mesh node comprises a main receiver, a wakeup receiver and a processor, and wherein said processor is arranged for controlling said main receiver and said wakeup receiver for:
receiving, by said wakeup receiver of said mesh node, a wake up signal message, wherein said wake up signal message comprises context information which is related to a path between a source mesh node and a destination mesh node corresponding to said wake up signal message;
determining, by said wakeup receiver of said mesh node, that said context information is applicable for said mesh node;
activating, by said wakeup receiver of said mesh node, said main receiver of said mesh node for subsequently receiving a data message.

It is noted that the advantages and definitions associated with the first aspect of the disclosure are also associated with the second aspect of the present disclosure.

In an example, the context information comprises an identification of a next mesh node in said path between said source mesh node and said destination mesh node, and wherein said processor is arranged for controlling said wakeup receiver for:
determining, by said wakeup receiver of said mesh node, that said mesh node corresponds to said identification of said next mesh node in said path.

In a further example, the mesh node comprises a forwarding table having listed source address and destination address pairs for which said mesh node is to act as a relay, and said context information comprises a Path Identifier, PID, reflecting a source address of said source mesh node and a destination address of said destination mesh node, and wherein said processor is arranged for controlling said wakeup receiver for:
determining, by said wakeup receiver of said mesh node, that said PID is associated to a source address and destination address pair in said forwarding table.

In another example, the context information comprises a Message identifier, MID, reflecting a source address of said source mesh node and a Sequence number, SEQ, that is increased for each source address for every new Protocol Data Unit, PDU, wherein said processor is arranged for controlling said wakeup receiver for:
determining, by said wakeup receiver of said mesh node, that said MID is not associated to a network PDU in a cache of said mesh node.

In an example, the said context information comprises a Time-To-Live, TTL, field reflecting a number of hops of said wakeup signal message in said wireless mesh network, wherein processor is arranged for controlling said main receiver and said wakeup receiver for:
receiving, by said main receiver of said mesh node, said data message;
receiving, by any of said wakeup receiver and said main receiver, a further wakeup signal message comprising context information which is related to said same path between said source mesh node and said destination mesh node corresponding;
determining, by any of said wakeup receiver and said main receiver, that a TTL field in said context information of said further wakeup signal message is lower that a TTL field in said context information of said wakeup signal message;
forwarding, by said mesh node, said received data message in said wireless mesh network based on said determination.

In a further example, the processor is further arranged for controlling said mesh node for:
forwarding, by said mesh node, said wakeup signal message in said wireless mesh network.

In another example, the processor is arranged for controlling any of said main receiver and said wakeup receiver for:
receiving, by any of said wakeup receiver and said main receiver, a further wakeup signal message, wherein said further wakeup signal message acts as an acknowledgment for said forwarded wakeup signal message.

In a third aspect, there is provided a computer program product comprising a computer readable medium having instructions stored thereon, which instructions cause a mesh node in wireless mesh network to implement a method in accordance with any of the examples as provided above.

It is noted that the wireless mesh network in accordance with the present disclosure may be any type of mesh network, such as a Bluetooth network, a Zigbee network or anything alike.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
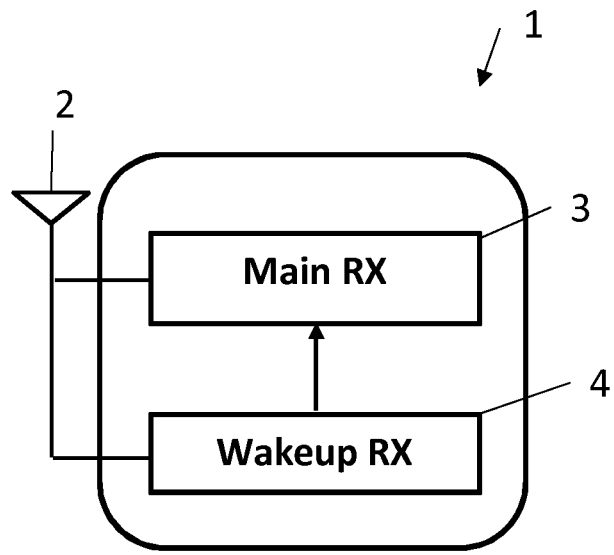
FIG. 1 schematically illustrates a node comprising a main receiver and a wake up receiver.

FIG. 1 schematically illustrates a node 1 comprising a main receiver 3 and a wake up receiver 4. As illustrated in the figure, both the receivers may communicate or receive packets via a common shared antenna 2. The skilled person understands that they may alternately receive packets via independent antennae. Furthermore, there is a link between the main receive 3 and the wakeup receiver 4 arranged to communicate the reception of a wakeup signal and to activate the wake up receiver of the node. Such an arrangement as shown in FIG. 1 is known to the skilled person and has advantages as disclosed herein previously.

Figure 2:
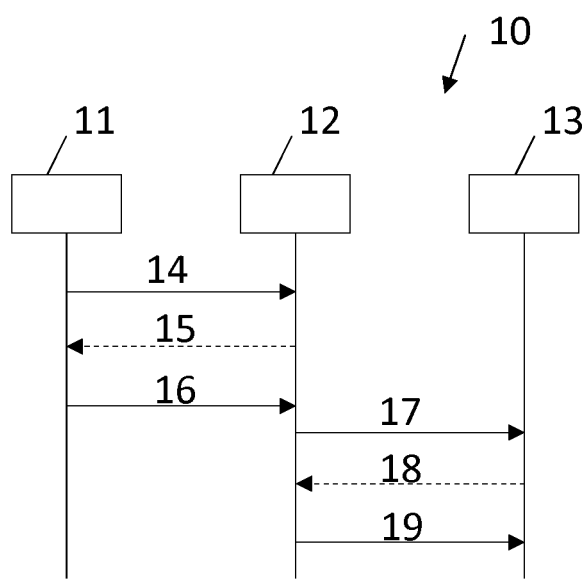
FIG. 2 schematically illustrates a method of transmitting data packets according to the prior art FIG. 3 schematically illustrates a method according to the present disclosure FIG. 4 schematically illustrates a method according to the present disclosure.

FIG. 2 schematically illustrates a method 10 of transmitting data packets according to the prior art. In the example illustrated in FIG. 2, data packets are transmitted from a source node 11 to a destination node 13 via a relay or intermediary node 12. Such a transmission is achieved within two hops—i.e. from source node 11 to relay node 12 and then from relay node 12 to destination node 13.

Firstly a wakeup signal 14 is sent from the source node 11 to the relay node 12. The source node 11 then waits for a wakeup response 15 from the relay node 12. Upon receiving a wakeup response 15, the data to be transmitted is sent 16. Here it is seen that for one data hop, 3 steps need to be performed and each step involves a propagation delay. In subsequent steps, the relay node 12 performs identical steps—send wakeup signal 17 to destination node 13, wait for wakeup response 18 and then transmit 19 the data. Therefore for a 2-hop transmission, a total of 6 steps need to be performed.

Such a method is known to the skilled person. Furthermore, such a method as shown in FIG. 2 cannot be directly applied to a Bluetooth mesh network as each node may need to wake up all receivers in the neighbourhood to make sure that the data message will be propagated all the way to the destination.

Figure 3:
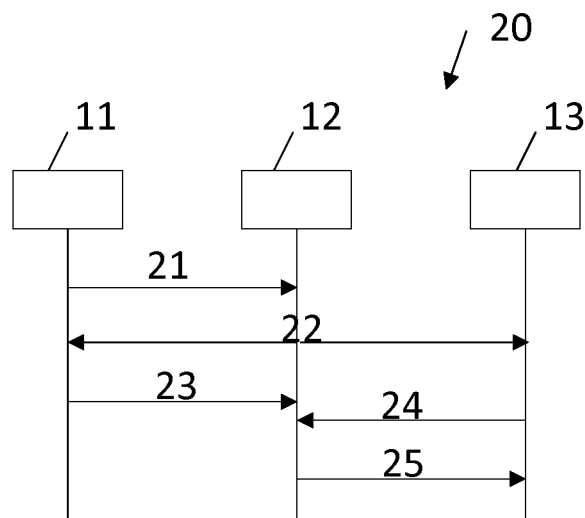

FIG. 3 schematically illustrates a method 20 according to the present disclosure. As an example, the method is illustrated and explained in the case of a two-hop transmission. The skilled person understands that the teaching can also be used for a multi-hop scenario involving more than three nodes. Before sending a data message, the source node 11 transmits a wakeup signal 21 frame with a context associated to the data message.

A relay node 12 receiving the wakeup signal 21 checks if the wakeup signal refers to a valid context information. If yes, the second node turns the main radio on and replicates the wakeup signal.

Only after the source node 11 receives 22 at least one copy of the wakeup signal, it sends 24 the data message. The source node 11 may wait a pre-determined time ("wakeup time") after the transmission of the wakeup signal 21 to collect multiple copies of wakeup signal before sending 23 the data message. The copy of the wakeup signal 22 is used as an acknowledgment of the transmission of the original wakeup signal.

In a preferred implementation, wakeup signals 21 and data messages 23, 25 are sent on different channels, so that there is no risk of collision between the data transmission from the first node and the wakeup signal replicated by a third node in the network. Alternatively, a random delay before the transmission of data is applied to mitigate the probability of collision with other data messages and wakeup signals.

Figure 4:
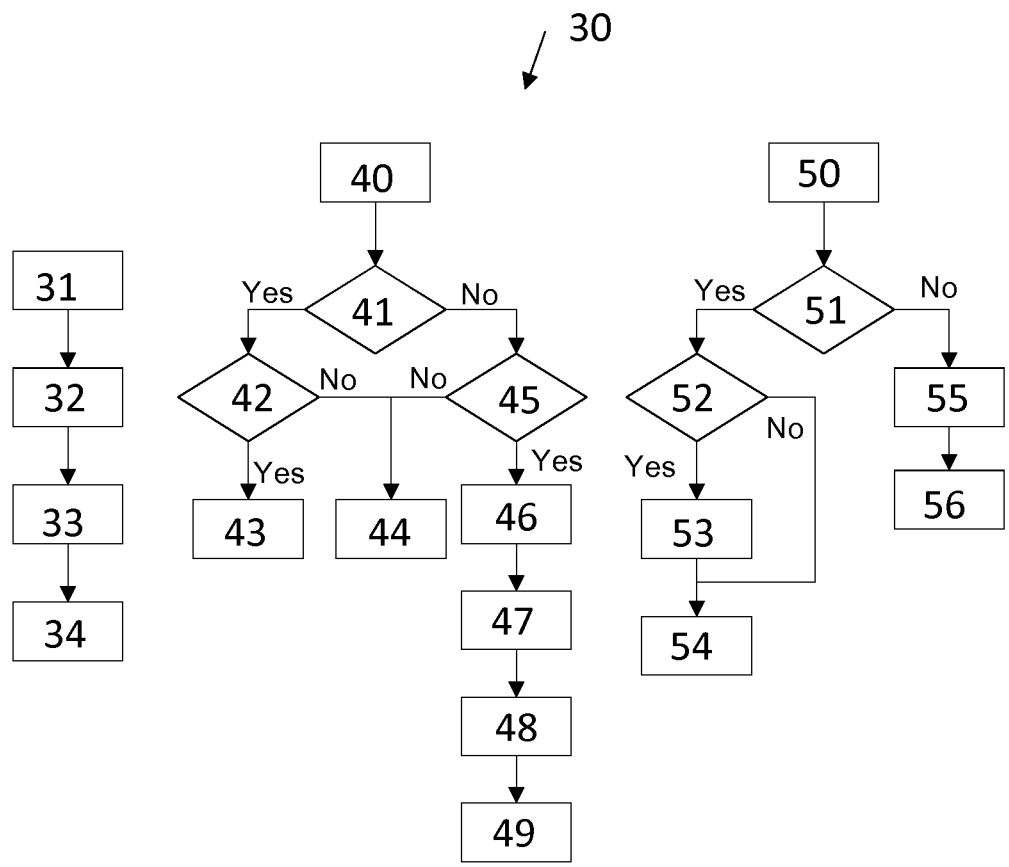

A third node, acting as a destination 13 of the data message also needs to replicate the wakeup signal in order to receive the data message. The destination 13 is reached within $(N_{hops}+2)$ steps instead of $3*N_{hops}$ required with the prior art FIG. 4 schematically illustrates a method 30 according to the present disclosure. Steps 31-34 are to be performed by a source node. Steps 40-49 are to be performed by a relay node, and steps 50-56 are to be performed by a relay node or the destination node. The skilled person understands that potentially every node in the network may act as a source, relay or a destination node. The steps and methods are illustrated separately only for the sake of clarity. Each node in the network is arranged to perform all of these steps depending on whether the node is the source, relay or destination node for a particular transmission.

In step 31, the node realizes that there is some data that needs to be transmitted. In step 32, the node sets a Path Identifier, PID, a Message Identifier, MID, and a Time To Live, TTL. When explicit next-hop information is not available, as in Bluetooth Mesh, a node can only know if it belongs to an end-to-end path by storing both SRC address (2 bytes) and DST address (2 bytes).

As an embodiment of this invention, SRC and DST field are combined in a short path identifier (PID), e.g., 2 byte, by combining one octet from SRC and one octet from DST. The PID is transmitted by the first node as a context in the wakeup signal frame. A second node receiving the wakeup signal wakes up and replicates the wakeup signal only if the PID is associated to a SRC and DST present in a forwarding table.

With a short PID, there is a risk that a node wakes up in the presence of a message with different SRC and DST providing the same PID. However, the chance of this false positive case decreases with the size of the PID and extra messages received can still be discarded by the network layer.

When explicit next-hop information is not available, as in Bluetooth Mesh, a node can only know if it belongs to an end-to-end path by storing both SRC address (2 bytes) and DST address (2 bytes).

As an embodiment of this invention, SRC and DST field are combined in a short path identifier (PID), e.g., 2 byte, by combining one octet from SRC and one octet from DST. The PID is transmitted by the first node as a context in the wakeup signal frame. A second node receiving the wakeup signal wakes up and replicates the wakeup signal only if the PID is associated to a SRC and DST present in a forwarding table.

With a short PID, there is a risk that a node wakes up in the presence of a message with different SRC and DST providing the same PID. However, the chance of this false positive case decreases with the size of the PID and extra messages received can still be discarded by the network layer.

Bluetooth Mesh network PDUs are propagated in the network for a maximum number of hops defined by the TTL field in the Network PDU, which is decremented at each hop until it reaches 1 and it is not propagated further.

As an embodiment of this invention, the TTL field of the network PDU is also transmitted by the first node as part of the context information in the wakeup signal frame. A second node receiving the wakeup signal decrements the TTL field before propagating the wakeup signal.

By checking the TTL field of a received wakeup signal, the first node is able to distinguish the wakeup signal propagated by a next-hop node from a potential copy of the wakeup signal coming from other node. The first node only sends the data message if the wakeup signal is received with decremented TTL.

In a subsequent step 33, the wakeup signal is transmitted and the node starts 34 the wakeup timer, thereby waiting for an acknowledgment of the wakeup signal. Once a wakeup signal is received 40, the node checks 41 to see if the wakeup timer is still running. If the wakeup timer is still running, i.e. the acknowledgment of the wakeup signal is received within the waiting period, the node does a further check 42 to see if the message has the same PID, MID and if the TTL is decremented. If the check 42 is successful, the node understands that the wakeup has been successful 43. If check 42 yields that the received wakeup signal does not relate to the sent wakeup signal, the received wakeup signal is disregarded 44.

If at step 41, the wakeup timer is not running, it implies that the node receiving the wakeup signal has not yet sent out a wakeup signal. This can be expected, if the node receiving the wakeup signal is a relay node. In such a scenario, the node checks 45 to see if the PID is valid and the MID is new. A valid PID means that the node receiving the wakeup signal is a part of the path between source and a destination node pair and a new MID indicates that the received wakeup signal is part of a new message being transmitted between the source—destination node pairs.

If the PID is not valid or the MID is not new, the received wakeup signal is discarded 44. I fit is determined that the PID is valid and the MID is new, steps 46-49 are performed. In step 46, the TTL is decremented by 1 in order to keep track of the number of hops. In step 47, the wakeup signal is forwarded by the node to the remaining nodes in the network. In step 48, the node starts a wakeup timer in order to wait for a predetermined duration of time for an acknowledgment of the wakeup signal forwarded in step 47. Finally, in step 48, the main receiver of the node is turned on, thereby allowing receipt and transmission of data packets.

Upon expiry 50 of a wakeup timer, the node checks 51 to see if wakeup has been successful. In other words, if an acknowledgment of the transmitted wakeup signal has been received. If no acknowledgment has been received, the wakeup signal is re-transmitted 55 and the wakeup timer is started again 56. If at step 51, it is determined that wakeup has been successful, The node checks 52 if there are any data messages to be transmitted. Data messages may need to be transmitted if the node performing these steps is a relay node. On the other hand, there may be no data messages that need transmission due to two reasons, namely The node received a data message with TTL=0, indicating that the data message should not be transmitted further in the network because the node is the destination node or because the maximum number of hops for a particular message being transmitted has been exceeded.

The relay node has not yet received a data message that needs to be (re) transmitted.

If there are data messages to be transmitted, the messages are transmitted 53 and then the main receiver is turned off 54. If at step 52, it is determined that there are no messages to be transmitted, the main receiver is turned off 54.

Figure 5:
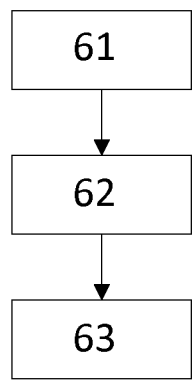
FIG. 5 schematically illustrates a method according to the present disclosure.

FIG. 5 schematically illustrates a method 60 according to the present disclosure. The method 60 of waking up a mesh node in a wireless mesh network, wherein the mesh node comprises a main receiver and a wakeup receiver. The method comprises the steps of receiving 61, by said wakeup receiver of said mesh node, a wake up signal message, wherein said wake up signal message comprises context information which is related to a path between a source mesh node and a destination mesh node corresponding to said wake up signal message. In a further step of determining 62, by said wakeup receiver of said mesh node, it is determined that said context information is applicable for said mesh node. In a final step of activating 63, by said wakeup receiver of said mesh node, the main receiver of said mesh node is activated for subsequently receiving a data message.

Figure 6:
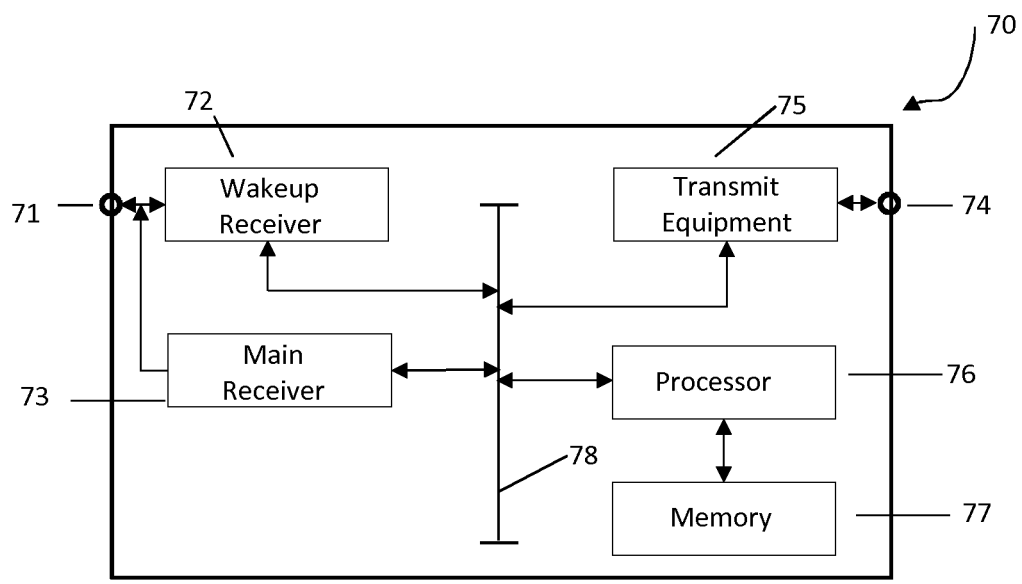
FIG. 6 schematically illustrates a mesh node according to the present disclosure.

FIG. 6 schematically illustrates a mesh node 70 according to the present disclosure. The mesh node 70 is arranged for operation in a wireless mesh network such as a Bluetooth Mesh network, wherein said mesh node 70 comprises a main receiver 73, a wakeup receiver 72 and a processor 76, and wherein said processor 76 is arranged for controlling said main receiver 73 and said wakeup receiver 72 for receiving, by said wakeup receiver 72 of said mesh node 70, a wake up signal message, wherein said wake up signal message comprises context information which is related to a path between a source mesh node and a destination mesh node corresponding to said wake up signal message. Subsequently the processor 76 is arranged for determining, by said wakeup receiver 72 of said mesh node, that said context information is applicable for said mesh node 70, and activating, by said wakeup receiver 72 of said mesh node, said main receiver 73 of said mesh node for subsequently receiving a data message The main receiver and the wakeup receiver may receive messages via an antenna 71. Furthermore, the mesh node 70 comprises transmit equipment 74, 75 arranged to transmit any received data messages. The mesh node further comprises a memory 77 which is arranged for storing computer readable instructions which when executed by the processor 76 cause the mesh node to perform a method according to a method as disclosed herein. All the internal components 71-77, of the mesh node 70 communicate with one another over an internal bus 78.

Other variations to the discloses examples can be understood and effected by those skilled in the art of practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above. They can be modified and enhanced by those skilled in the art beyond the scope of the present disclosure as disclosed in the appended claims without having to apply inventive skills.

The invention claimed is:

1. A method of waking up a mesh node in a wireless mesh network, wherein said mesh node comprises a main receiver and a wakeup receiver, and wherein the method comprises:
receiving, by said wakeup receiver of said mesh node, a wake up signal message, wherein said wake up signal message comprises context information which is related to a path between a source mesh node and a destination mesh node corresponding to said wake up signal message;
determining, by said wakeup receiver of said mesh node, that said context information is applicable for said mesh node, the determining including determining that said mesh node actively participates in the path between the source mesh node and the destination mesh node;
activating, by said wakeup receiver of said mesh node, said main receiver of said mesh node for subsequently receiving a data message; and
forwarding, by said mesh node, said wakeup signal message in said wireless mesh network.

2. The method in accordance with claim 1, wherein said context information comprises an identification of a next mesh node in said path between said source mesh node and said destination mesh node, and wherein said determining comprises determining, by said wakeup receiver of said mesh node, that said mesh node corresponds to said identification of said next mesh node in said path.

3. The method in accordance with claim 1, wherein said mesh node comprises a forwarding table having listed source address and destination address pairs for which said mesh node is to act as a relay, and said context information comprises a Path Identifier (PID) reflecting a source address of said source mesh node and a destination address of said destination mesh node, and wherein said determining comprises determining, by said wakeup receiver of said mesh node, that said PID is associated to a source address and destination address pair in said forwarding table.

4. The method in accordance with claim 1, wherein said context information comprises a Message identifier (MID) reflecting a source address of said source mesh node and a Sequence number (SEQ) that is increased for each source address for every new Protocol Data Unit (PDU), wherein said determining comprises determining, by said wakeup receiver of said mesh node, that said MID is not associated to a network PDU in a cache of said mesh node.

5. The method in accordance with claim 1, wherein said context information comprises a Time-To-Live (TTL) field reflecting a number of hops of said wakeup signal message in said wireless mesh network, wherein said method further comprises:
receiving, by said main receiver of said mesh node, said data message;
receiving, by any of said wakeup receiver and said main receiver, a further wakeup signal message comprising context information which is related to said same path between said source mesh node and said destination mesh node corresponding to said wake up signal message;
determining, by any of said wakeup receiver and said main receiver, that a TTL field in said context information of said further wakeup signal message is lower that a TTL field in said context information of said wakeup signal message;
forwarding, by said mesh node, said received data message in said wireless mesh network based on said determination.

6. The method in accordance with claim 1, wherein said method further comprises receiving, by any of said wakeup receiver and said main receiver, a further wakeup signal message, wherein said further wakeup signal message acts as an acknowledgement for said forwarded wakeup signal message.

7. A mesh node arranged for operation in a wireless mesh network, wherein said mesh node comprises a main receiver, a wakeup receiver and a processor, and wherein said processor configured to control said main receiver and said wakeup receiver for:
receiving, by said wakeup receiver of said mesh node, a wake up signal message, wherein said wake up signal message comprises context information which is related to a path between a source mesh node and a destination mesh node corresponding to said wake up signal message;
determining, by said wakeup receiver of said mesh node, that said context information is applicable for said mesh node, the determining including determining that said mesh node actively participates in the path between the source mesh node and the destination mesh node;
activating, by said wakeup receiver of said mesh node, said main receiver of said mesh node for subsequently receiving a data message; and
forwarding, by said mesh node, said wakeup signal message in said wireless mesh network.

8. The mesh node in accordance with claim 7, wherein said context information comprises an identification of a next mesh node in said path between said source mesh node and said destination mesh node, and wherein said processor is configured to control said wakeup receiver for:
determining, by said wakeup receiver of said mesh node, that said mesh node corresponds to said identification of said next mesh node in said path.

9. The mesh node in accordance with claim 7, wherein said mesh node comprises a forwarding table having listed source address and destination address pairs for which said mesh node is to act as a relay, and said context information comprises a Path Identifier (PID) reflecting a source address of said source mesh node and a destination address of said destination mesh node, and wherein said processor is arranged for controlling said wakeup receiver for:
determining, by said wakeup receiver of said mesh node, that said PID is associated to a source address and destination address pair in said forwarding table.

10. The mesh node in accordance with claim 7, wherein said context information comprises a Message identifier (MID) reflecting a source address of said source mesh node and a Sequence number (SEQ) that is increased for each source address for every new Protocol Data Unit (PDU) wherein said processor is configured to control said wakeup receiver for determining, by said wakeup receiver of said mesh node, that said MID is not associated to a network PDU in a cache of said mesh node.

11. The mesh node in accordance with claim 7, wherein said context information comprises a Time-To-Live (TTL) field reflecting a number of hops of said wakeup signal message in said wireless mesh network, wherein the processor is configured to control said main receiver and said wakeup receiver for:
- receiving, by said main receiver of said mesh node, said data message;
- receiving, by any of said wakeup receiver and said main receiver, a further wakeup signal message comprising context information which is related to said same path between said source mesh node and said destination mesh node corresponding to said wake up signal message;
- determining, by any of said wakeup receiver and said main receiver, that a TTL field in said context information of said further wakeup signal message is lower that a TTL field in said context information of said wakeup signal message;
- forwarding, by said mesh node, said received data message in said wireless mesh network based on said determination.

12. The mesh node in accordance with claim 7, wherein said processor is configured to control any of said main receiver and said wakeup receiver for receiving, by any of said wakeup receiver and said main receiver, a further wakeup signal message, wherein said further wakeup signal message acts as an acknowledgement for said forwarded wakeup signal message.

13. A non-transitory computer readable medium having instructions stored thereon, which instructions cause a mesh node in a wireless mesh network to:
- receive, by a wakeup receiver of said mesh node, a wake up signal message, wherein said wake up signal message comprises context information which is related to a path between a source mesh node and a destination mesh node corresponding to said wake up signal message;
- determine, by said wakeup receiver of said mesh node, that said context information is applicable for said mesh node, the determining including determining that said mesh node actively participates in the path between the source mesh node and the destination mesh node;
- activate, by said wakeup receiver of said mesh node, a main receiver of said mesh node for subsequently receiving a data message; and
- forward, by said mesh node, said wakeup signal message in said wireless mesh network.

* * * * *

UNITED STATES PATENT AND TRADEMARK OFFICE
CERTIFICATE OF CORRECTION

PATENT NO. : 12,052,644 B2
APPLICATION NO. : 17/617783
DATED : July 30, 2024
INVENTOR(S) : Di Marco et al.

Page 1 of 2

It is certified that error appears in the above-identified patent and that said Letters Patent is hereby corrected as shown below:

In the Specification

In Column 2, Line 25, delete "reception" and insert -- reception. --, therefor.

In Column 2, Line 49, delete "radio" and insert -- radio. --, therefor.

In Column 3, Line 31, delete "shall than" and insert -- shall then --, therefor.

In Column 4, Lines 62-63, delete "lower that" and insert -- lower than --, therefor.

In Column 5, Line 11, delete "efficiently" and insert -- efficient --, therefor.

In Column 6, Lines 38-39, delete "lower that" and insert -- lower than --, therefor.

In Column 6, Line 49, delete "receiver for" and insert -- receiver for: --, therefor.

In Column 7, Line 6, delete "art" and insert -- art. --, therefor.

In Column 7, Line 8, delete "disclosure" and insert -- disclosure. --, therefor.

In Column 8, Line 29, delete "art" and insert -- art. --, therefor.

In Column 10, Line 1, delete "successful, The" and insert -- successful, the --, therefor.

In Column 10, Line 48, delete "message" and insert -- message. --, therefor.

Signed and Sealed this
Eighteenth Day of February, 2025

Coke Morgan Stewart
*Acting Director of the United States Patent and Trademark Office*

In the Claims

In Column 12, Lines 9-10, in Claim 5, delete "lower that" and insert -- lower than --, therefor.

In Column 13, Lines 20-21, in Claim 11, delete "lower that" and insert -- lower than --, therefor.